United States Patent
Rung et al.

(10) Patent No.: US 8,625,831 B2
(45) Date of Patent: Jan. 7, 2014

(54) HEARING AID EARPIECE AND A METHOD OF MANUFACTURING A HEARING AID EARPIECE

(75) Inventors: Martin Rung, Bronshoj (DK); Jørgen Mejner Olsen, Hillerod (DK); Klaus Henrik Vaarbroe, Skovlunde (DK); Peter Nordland Jensen, Kastrup (DK); Inge Balling, Vekso Sjalland (DK); Morten Agerbaek Nordahn, Bronshoj (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 13/133,627

(22) PCT Filed: Dec. 11, 2008

(86) PCT No.: PCT/EP2008/067323
§ 371 (c)(1),
(2), (4) Date: Jul. 13, 2011

(87) PCT Pub. No.: WO2010/066299
PCT Pub. Date: Jun. 17, 2010

(65) Prior Publication Data
US 2011/0261985 A1 Oct. 27, 2011

(51) Int. Cl.
*H04R 25/00* (2006.01)
*G06F 19/00* (2011.01)

(52) U.S. Cl.
USPC ............................................. 381/328; 700/98

(58) Field of Classification Search
USPC .................. 381/312, 322, 328, 380
See application file for complete search history.

(56) References Cited

U.S. PATENT DOCUMENTS

| | | | |
|---|---|---|---|
| 3,170,046 A | 2/1965 | Leale | |
| 4,418,787 A | 12/1983 | Eggert et al. | |
| 4,451,709 A * | 5/1984 | Waxman | 381/327 |
| 7,110,562 B1 | 9/2006 | Feeley et al. | |
| 2006/0115105 A1* | 6/2006 | Brumback et al. | 381/328 |
| 2006/0171549 A1* | 8/2006 | Holmes | 381/330 |

FOREIGN PATENT DOCUMENTS

| | | |
|---|---|---|
| DE | 1274658 | 8/1968 |
| EP | 1629806 | 3/2006 |

OTHER PUBLICATIONS

Gerald A. Studbaker, The Acoustical Effect of Various Factors on the Frequency Response of a Hearing-Aid Receiver, Memphis State University, vol. 22.*
International Search Report for PCT/EP2008/067323 dated Feb. 19, 2009.

(Continued)

*Primary Examiner* — Brian Ensey
*Assistant Examiner* — Norman Yu
(74) *Attorney, Agent, or Firm* — Sughrue Mion, PLLC

(57) ABSTRACT

A hearing aid earpiece (1) is provided, that is custom fitted to the individual shape of the ear canal of a user and manufactured in a rapid prototyping process. The earpiece comprises a sound conduit (3) that is adapted for conveying an acoustic signal from an acoustic inlet port towards an acoustic outlet port and wherein the sound conduit is looped such that at least one geometrical plane will intersect the sound conduit at least three times thereby providing a length of the sound conduit exceeding a largest outer dimension of the hearing aid earpiece. The invention also relates to a hearing aid comprising such a hearing aid earpiece and a method for manufacturing such an earpiece.

21 Claims, 5 Drawing Sheets

(56) References Cited

OTHER PUBLICATIONS

Gerald A. Studebaker, The Acoustical Effect of Various Factors on the Frequency Response of a Hearing-Aid Receiver, Journal of the Audio Engineering Society, Audio Engineering Society, New York, NY, vol. 22, No. 5, Jun. 1, 1974 pp. 329-334, XP000794220.

M.C. Killion, et al, "A Low Frequency Emphasis Open Canal Hearing Aid", Hearing Instruments, Harcourt Brack Jovanovich Publ, Duluth, Minnesota, US, vol. 35, No. 8, Aug. 1, 1984, pp. 30, 32, 34, 66—XP000795071.

Chinese Office Action for Chinese Application No. 200880132169.5 dated Jun. 24, 2013.

\* cited by examiner

HEARING AID EARPIECE AND A METHOD OF MANUFACTURING A HEARING AID EARPIECE

BACKGROUND OF THE INVENTION

1. Field of the Invention

The present invention relates to hearing aids. The invention, more specifically, relates to an earpiece for a hearing aid adapted for increasing the hearing aid output in at least one frequency range. The invention further relates to a method of making such an earpiece for a hearing aid.

In the context of the present disclosure, a hearing aid should be understood as a small, battery-powered, microelectronic device designed to be worn behind or in the human ear by a hearing-impaired user. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a battery, a microelectronic circuit comprising a signal processor, and an acoustic output transducer. The signal processor is preferably a digital signal processor. The hearing aid is enclosed in a casing suitable for fitting behind or in a human ear.

As the name suggests, Behind-The-Ear (BTE) hearing aids are worn behind the ear. To be more precise an electronics unit comprising a housing containing the major electronics parts thereof is worn behind the ear. An earpiece for emitting sound to the hearing aid user is worn in the ear, e.g. in the concha or the ear canal. In a traditional BTE hearing aid, a sound tube is used because the output transducer, which in hearing aid terminology is normally referred to as the receiver, is located in the housing of the electronics unit. In some modern types of hearing aids a conducting member comprising electrical conductors is used, because the receiver is placed in the earpiece in the ear. Such hearing aids are commonly referred to as Receiver-In-The-Ear (RITE) hearing aids. In a specific type of RITE hearing aids the receiver is placed inside the ear canal. This is known as Receiver-In-Canal (RIC) hearing aids.

In-The-Ear (ITE) hearing aids are designed for arrangement in the ear, normally in the funnel-shaped outer part of the ear canal. This type of hearing aid requires a very compact design in order to allow it partly to be arranged in the ear canal, partly to house the components necessary for operation of the hearing aid, such as microphones, a battery, a microelectronic circuit comprising a signal processor, and an acoustic output transducer.

2. The Prior Art

DE-AS-1274658 discloses a receiver and a corresponding elastic casing, wherein the receiver sound output and the casing sound output are separated from each other, and a sound conduit between the two sound outputs are formed between the outer surface of the receiver housing and the inner surface of the corresponding elastic casing. Hereby the sound conduit is claimed to have sufficient length for increasing the low frequencies.

One problem with this system is that the sound conduit must run along the outer surface of the receiver housing. Therefore it is not possible to physically separate the receiver housing from the sound conduit. For some RITE hearing aids it is advantageous to have the receiver positioned in the concha or similar part of the external ear, and the main part of the sound conduit positioned in the ear canal. Obviously this is especially advantageous when the receiver is too large to be positioned in the ear canal.

U.S. Pat. No. 3,170,046 discloses an ITE hearing aid with an electroformed metal housing. Inside the metal housing the transmission of sound is conveyed by a sound tube, that connects the receiver and the terminal end of the metal housing located in the ear canal. The sound tube is preferably made of thin-walled natural rubber or similar materials such as polyethylene or vinyl. It is further disclosed that the reduction of acoustic feedback may be improved by providing a tortuous path for the sound tube.

EP-A1-1629806 discloses a hearing protection earplug with a resonance cavity, which is provided with an inner mechanical structure. For hearing protection devices it is desirable to provide for sufficient attenuation of undesired sound signals, such as noise, while preserving a more or less natural hearing impression for desired sound signals, such as natural speech, in order to enable speech communication in noisy environments. In other words, it would be desirable to have more or less frequency independent attenuation in order to achieve a close to natural hearing impression. In this respect it is important to note that the outer ear and the ear canal of a person have an individual natural resonance around 2.5 kHz to 3 kHz so that natural speech for which significant information is carried in this frequency region is selected over other sound signals such as noise. Any earplug worn in the ear canal will disturb this natural frequency of the ear canal. This problem is addressed by compensating the shortening of the ear canal by the earplug by correspondingly increasing the effective acoustic length within the earplug. In other words, if the cavity of the earplug is dimensioned such that the ear canal is effectively cut in two equal parts, the cavity of the earplug would be designed such that the effective acoustic length within the cavity is about double the geometrical length of the cavity.

However, despite the advanced technology level in current hearing aids some hearing impaired require a hearing aid output that is not easily achieved with the current technology. A significant part of the hearing impaired that require a very high hearing aid output will benefit especially from a very high output around 1 kHz.

It may be difficult for RITE, RIC or ITE hearing aids to provide a very high output around 1 kHz.

It is therefore a feature of the present invention to overcome at least these drawbacks and provide hearing aid earpieces and hearing aids that are easy to manufacture and optimized for hearing impaired users that require a high output around 1 kHz.

It is another feature of the current invention to provide a method for manufacturing a hearing aid earpiece according to the invention.

SUMMARY OF THE INVENTION

The invention, in a first aspect, provides a hearing aid earpiece comprising a body that is custom fitted to the individual shape of the ear canal of a user, said body being manufactured in a rapid prototyping process and including a sound conduit adapted for conveying an acoustic signal from an acoustic inlet port towards an acoustic outlet port, wherein the sound conduit is formed in a computer model to be looped such that at least one geometrical plane will intersect the sound conduit at least three times thereby providing a length of the sound conduit exceeding a largest outer dimension of the hearing aid earpiece.

This provides a hearing aid earpiece that is simple in manufacturing and allows the second conduit length to be increased, relative to the second conduit length provided by known hearing aid earpieces.

According to an embodiment the earpiece may accommodate all the components necessary for an ITE hearing aid.

The invention, in a second aspect, provides a hearing aid comprising an earpiece comprising a body that is custom fitted to the individual shape of the ear canal of a user, said body being manufactured in a rapid prototyping process and including a sound conduit adapted for conveying an acoustic signal from an acoustic inlet port towards an acoustic outlet port, wherein the sound conduit is formed in a computer model to be looped such that at least one geometrical plane will intersect the sound conduit at least three times thereby providing a length of the sound conduit exceeding a largest outer dimension of the hearing aid earpiece.

This provides a hearing aid that is simple in manufacturing and capable of increasing the hearing aid output in a specific frequency range.

The invention, in a third aspect, provides a method for manufacturing a hearing aid earpiece comprising a body that is custom fitted to the individual shape of the ear canal of a user, and including a sound conduit adapted for conveying an acoustic signal from an acoustic inlet port towards an acoustic outlet port, wherein the sound conduit is looped such that at least one geometrical plane will intersect the sound conduit at least three times thereby providing a length of the sound conduit exceeding a largest outer dimension of the hearing aid earpiece, said method comprising the steps of, acquiring data representing the shape of a part of the ear including the ear canal of a hearing aid user, forming a three-dimensional computer model of the outer shape of the hearing aid component based on the acquired data, forming a three-dimensional computer model of the shape of the sound conduit inside the hearing aid earpiece based on a predetermined sound conduit length, and manufacturing the hearing aid earpiece in a rapid prototyping process based on said three-dimensional computer models. This method has the advantage of automating an otherwise very complex manufacturing process.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other different embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

In a traditional BTE hearing aid the length of the sound conduit, that guides the sound from the hearing aid receiver and into the ear canal and towards the tympanic membrane of the user wearing the hearing aid, is in the range of 60 to 90 mm depending on the ear size and the specific characteristic of the BTE hearing aid. Due to wavelength resonance in the sound conduit a traditional BTE hearing aid will have resonance peaks around 1 kHz, 3 kHz and 5 kHz. These peaks will disappear in the frequency response of an ITE and a RITE hearing aid, because these hearing aids only comprise a short sound conduit, and be replaced by a more smooth frequency response typically with a smaller resonance peak around 2.5 kHz, that is a result of hearing aid receiver characteristics. This results in the hearing aid output around 1 kHz being significantly lowered in the ITE and RITE hearing aids relative to the traditional BTE hearing aid. Consequently the ITE and RITE hearing aids may yield insufficient output for hearing impaired whose hearing losses require a high hearing aid output around 1 kHz.

Figure 1:
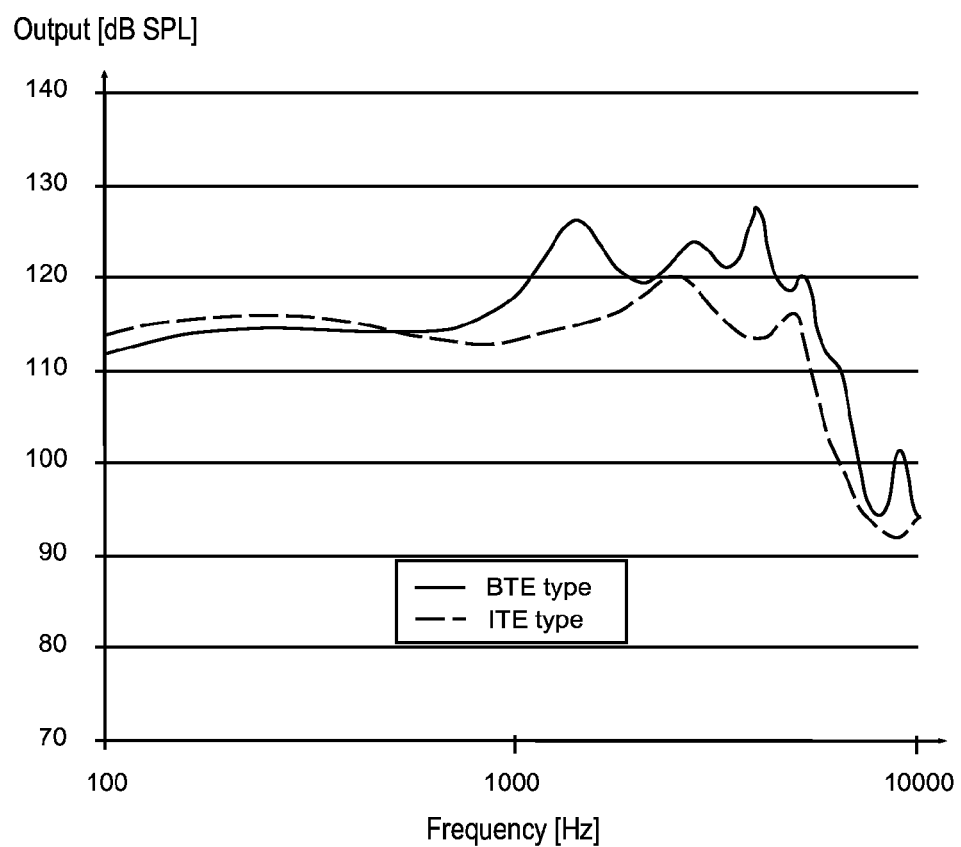
FIG. 1 illustrates hearing aid output as a function of frequency for respectively a traditional BTE and an ITE hearing aid.

Reference is first made to FIG. 1, which illustrates hearing aid output for respectively a traditional BTE (with the receiver in the BTE housing and a sound tube used for transmitting the sound into the ear canal of a hearing aid user) and an ITE hearing aid configured with the same receiver as the BTE. The outputs of both hearing aids have been measured according to IEC 118. Please note that in the present context the output of the ITE hearing aid will be similar to that of a RITE hearing aid.

FIG. 1 illustrates that the frequency response of the traditional BTE hearing aid has resonance peaks at 1 kHz, 3 kHz and 5 kHz. For the ITE hearing aid a single and smaller peak at around 2.5 kHz replaces these resonance peaks, thus leading to a more smooth frequency response. At 1 kHz the output of the ITE hearing aid is significantly lowered and at 1.5 kHz the output is decreased by 11 dB. Therefore an ITE or RITE hearing aid may yield insufficient output for hearing impaired whose hearing deficits require a high hearing aid output around 1 kHz.

As a general rule of thumb the fundamental wavelength resonance of the sound conduit will be positioned at a frequency given by the velocity of sound divided by four times the length of the sound conduit. The higher order resonance frequencies are odd multiples of this fundamental resonance. Therefore the second order resonance frequency is three times the fundamental resonance frequency and the third order resonance frequency is five times the fundamental resonance frequency. Generally the resonance peak height decreases with increasing order of resonance.

The sound conduit could be designed to have a length in the range of 60-90 mm, preferably approximately 85 mm. Hereby a fundamental resonance frequency in the range 0.9-1.2 kHz, preferably approximately 1 kHz, results. However for some types of hearing loss the sound conduit could be designed to have a length in the range of 90-105 mm. Hereby a fundamental resonance frequency in the range 0.8-0.9 kHz results. Furthermore even longer sound conduits could be considered if sufficient space is available in the earpiece.

Many factors affect the exact frequencies of the resonance peaks. One is the diameter of the sound conduit. For typical dimensions found in hearing aids the wavelength resonance frequencies and peak heights decrease with decreasing sound conduit diameter.

The combination of the inlet port diameter, outlet port diameter and length of the sound conduit affects the efficiency with which acoustical power is transmitted from receiver and to the tympanic membrane of the hearing aid user wearing the earpiece. This is well known from the theory of acoustic horns. Typically the sound conduit diameter will be gradually increasing from the inlet port diameter towards the outlet port diameter. The sound conduit diameter may be linearly increasing or increasing according to some other function.

The sound conduit according to the present invention could be designed with an inlet port diameter in the range of 1.0-1.7 mm, an outlet port diameter in the range of 2.0-4.0 mm and a length above 60 mm. As an example an inlet port diameter of 1.3 mm combined with an outlet port diameter of 2.2 mm and a sound conduit length of 85 mm will result in an efficiency boost of around 5 dB for frequencies above around 0.7 kHz.

Figure 2:
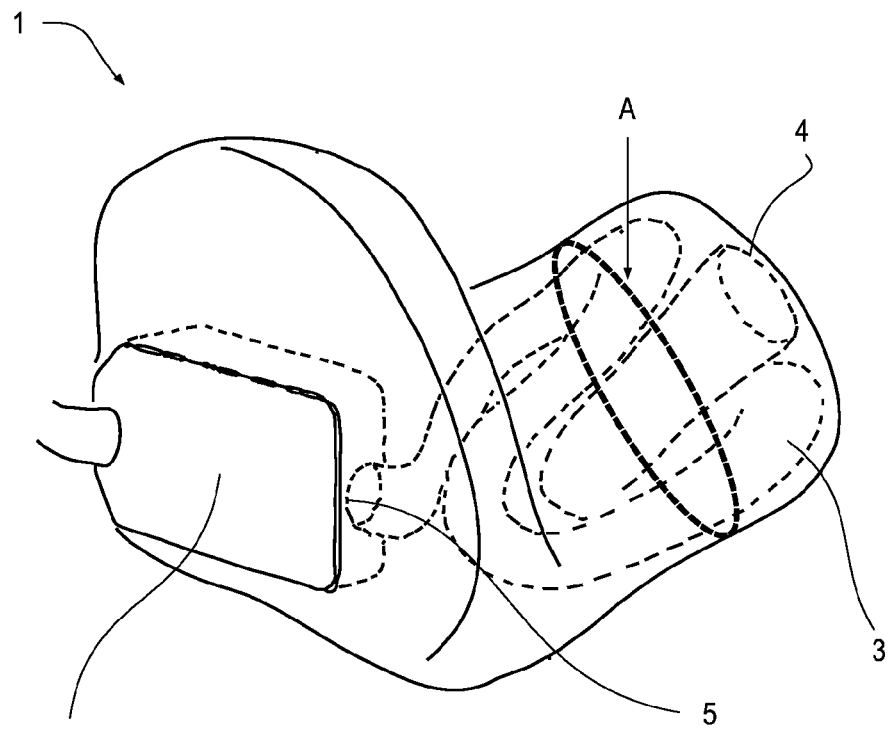
FIG. 2 illustrates a hearing aid earpiece according to a first embodiment of the invention.

FIG. 2 shows a RITE earpiece 1 according to a first embodiment of the invention. The earpiece 1 comprises a body that is custom fitted to the individual shape of the ear canal of the user wearing the hearing aid earpiece. The body comprises a sound conduit 3 adapted for conveying sound from a receiver 2 and towards the tympanic membrane of a hearing aid user wearing the earpiece, means for accommodating the receiver 2 within the body and holding means (not shown) adapted for providing an acoustical connection between the receiver and the sound conduit. The sound from the receiver is coupled to the sound conduit through the input port 5 and output through the sound conduit outlet port 4. The sound conduit 3 is looped in order to allow the sound conduit length to be increased relative to the sound conduit length provided by known hearing aid earpieces. One way of obtaining the looped sound conduit is by providing a number of sound conduit parts, that extend substantially along the general axis of the open ear canal of the intended user and are interconnected via a number of U-shaped or 180 degree bends. The sound conduit parts that extend substantially along the general axis of the open ear canal of the intended user may be approximately straight if the shape of the ear canal of the intended user so permits.

The geometrical plane A is perpendicular to the general axis of the open ear canal of the intended user.

In another definition a surface normal to the geometrical plane A is parallel to a tangent to the center axis of the ear canal of the intended user. The center axis is defined as the curved axis that follows the center of the ear canal. A numerical procedure may be used to extract this axis. This numerical procedure is further described in "Measurement and specification of the human ear canal geometry" by Michael R. Stinson, in The Journal of the Acoustical Society of America, November 1985, Volume 78, Issue S1, p. S12.

Typically the earpiece will also accommodate a vent opening, that for reasons of clarity is not shown in the figure.

Figure 3:
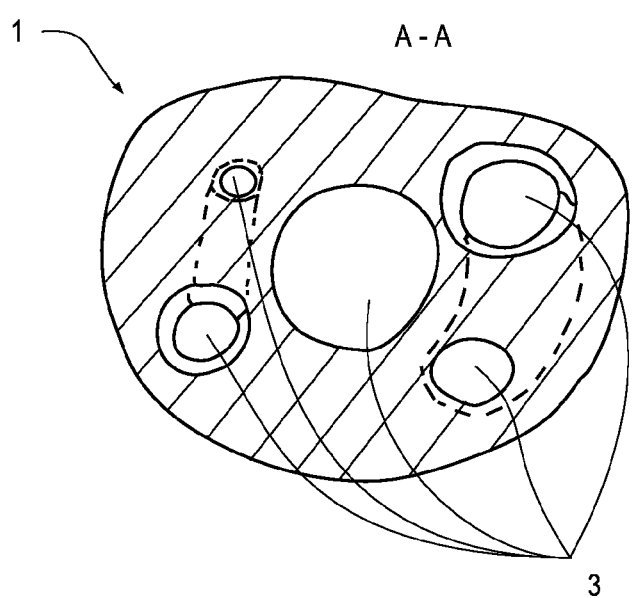
FIG. 3 illustrates a cross sectional view of a hearing aid earpiece according to the first embodiment of the invention.

Reference is now made to FIG. 3, which shows a cross sectional area of the earpiece 1 along a geometrical plane A. For the first embodiment the looped sound conduit 3 intersects the geometrical plane A five times.

However, due to the advanced manufacturing and design methods described in the present disclosure it is possible to shape the sound conduit such that it will intersect the geometrical plane A seven or even more times, where the maximum number of intersections is dependent on the size of the ear canal of the intended user.

Figure 4:
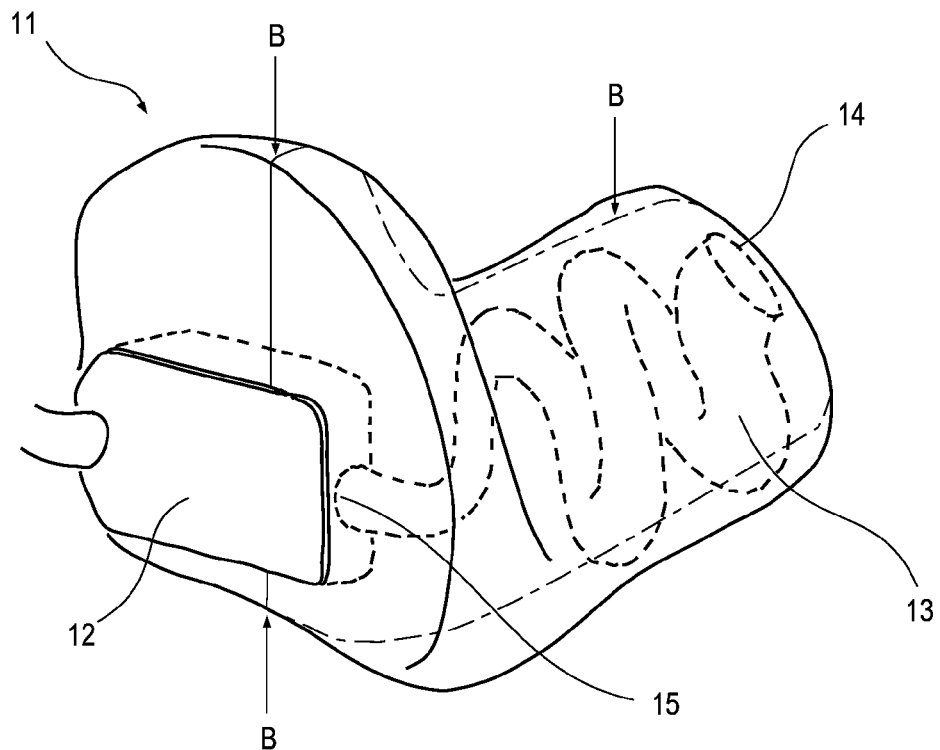
FIG. 4 illustrates a hearing aid earpiece according to a second embodiment of the invention.

FIG. 4 shows a RITE earpiece 11 according to a second embodiment of the invention. The earpiece 11 comprises a body that is custom fitted to the individual shape of the ear canal of the user wearing the hearing aid earpiece. The body comprises a sound conduit 13 adapted for conveying sound from a receiver 12 and towards the tympanic membrane of a hearing aid user wearing the earpiece, means for accommodating the receiver 12 within the body and holding means (not shown) adapted for providing an acoustical connection between the receiver and the sound conduit. The sound from the receiver is coupled to the sound conduit through the input port 15 and output through the sound conduit outlet port 14. The sound conduit 13 is looped in order to allow the sound conduit length to be increased relative to the sound conduit length provided by known hearing aid earpieces. The geometrical plane B is one plane selected to include the general axis of the open ear canal of the intended user.

Figure 5:
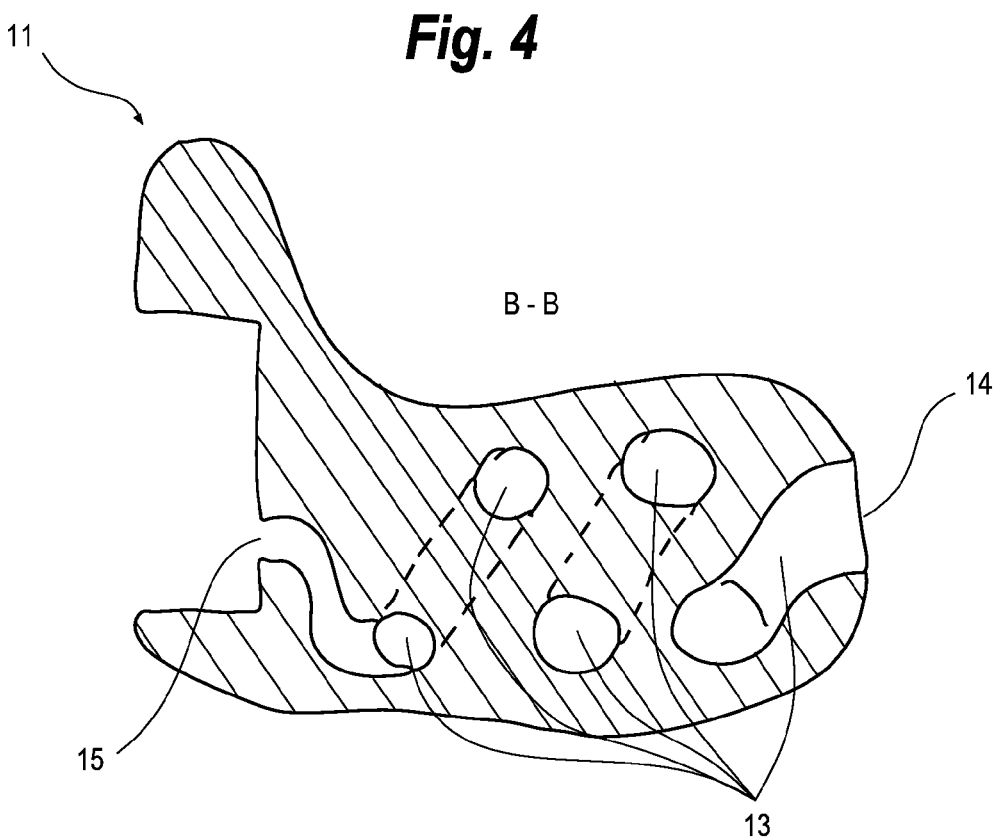
FIG. 5 illustrates a cross sectional view of a hearing aid earpiece according to the second embodiment of the invention.

Reference is now made to FIG. 5 that shows a cross sectional area of the earpiece 11 along the geometrical plane B. The sound conduit is given a helical shape that intersects the geometrical plane B five times.

Figure 6:
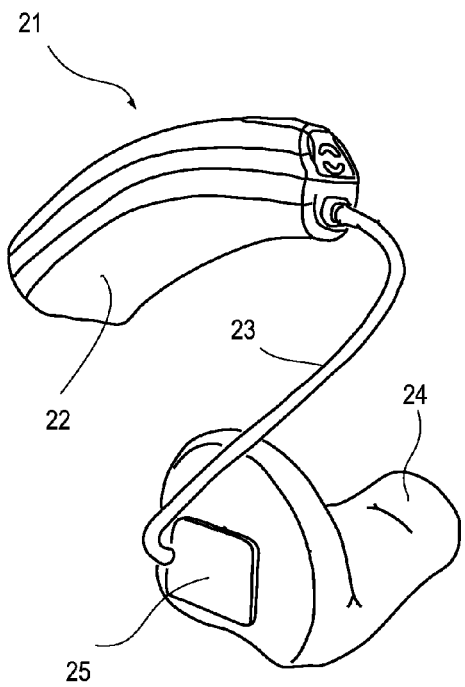
FIG. 6 illustrates a hearing aid according to a third embodiment of the invention.

FIG. 6 shows a hearing aid 21 according to a third embodiment of the invention. The hearing aid 21 comprises a BTE housing 22, a connector 23 and an earpiece 24. The connector serves to electrically connect the sound producing parts accommodated within the earpiece 24 with the BTE housing 22 and the electrical components therein. The earpiece 24 accommodates a receiver 25 and comprises a sound conduit (not shown) for conveying the sound from the receiver and towards the tympanic membrane of a hearing aid user wearing the earpiece.

In the third embodiment the earpiece will extend not only in the ear canal but also in part of the concha, and the receiver is arranged in the part of the earpiece extending in the concha, where the space will be less restricted compared to the ear canal. This is especially advantageous for children. When the receiver is placed in the concha part of the earpiece, the sound conduit conveying sound from the receiver to the tympanic membrane of a hearing aid user wearing the earpiece may be circled in the concha part of the earpiece before continuing into the ear canal part of the earpiece.

Figure 7:
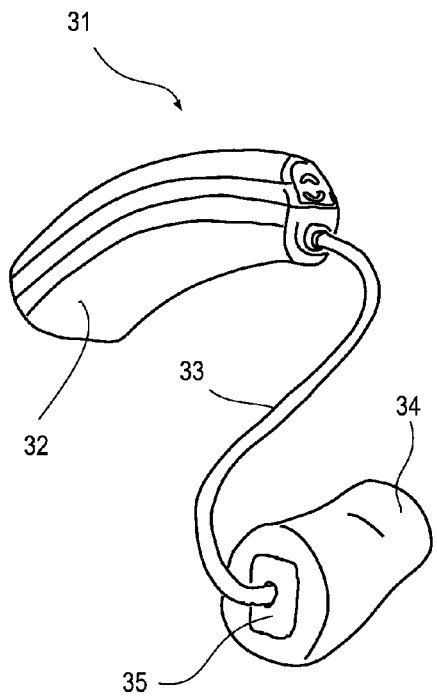
FIG. 7 illustrates a hearing aid according to a fourth embodiment of the invention.

FIG. 7 shows a hearing aid 31 according to a fourth embodiment of the invention. The hearing aid 31 comprises a BTE housing 32, a connector 33 and an earpiece 34. The connector serves to electrically connect the sound producing parts of the earpiece 34 with the BTE housing 32 and the electrical components therein. The earpiece 34 accommodates a receiver 35 and comprises a sound conduit (not shown) for conveying the sound from the receiver and towards the tympanic membrane of a hearing aid user wearing the earpiece. The earpiece 34 is adapted for being fully inserted into the ear canal. Hereby a less conspicuous hearing aid results.

Figure 8:
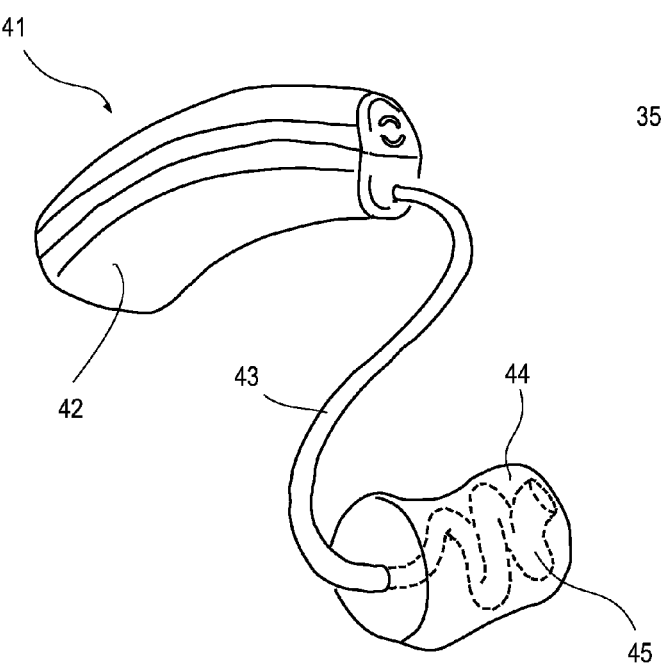
FIG. 8 illustrates a hearing aid according to a fifth embodiment of the invention.

FIG. 8 shows a hearing aid 41 according to fifth embodiment of the invention. The hearing aid 41 further comprises a BTE housing 42, a tube 43 and an earpiece 44. In the fifth embodiment the BTE housing accommodates electronics, one or more microphones and a receiver, in order that it may to pick up sounds, amplify them and produce an amplified acoustic output signal. The tube provides a conduit for conveying the acoustic signal from the receiver inside the BTE housing to the earpiece 44, and the earpiece couples the acoustic energy from the tube into the ear canal and towards the tympanic membrane of a hearing aid user wearing the earpiece. Inside the earpiece 44 the tube 43 is acoustically coupled to the sound conduit 45. In the fifth embodiment the earpiece 44 therefore comprises holding means adapted for providing an acoustical connection between the tube 43 and the sound conduit 45.

Hereby it becomes possible to e.g. move the fundamental wavelength resonance further down in frequency than is normally possible with traditional BTE hearing aids.

Figure 9:
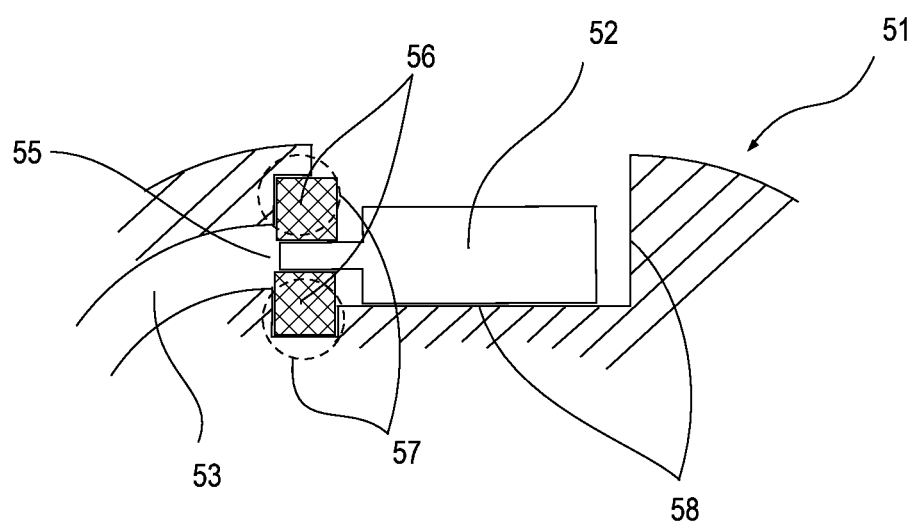
FIG. 9 illustrates a vertical section of an earpiece with a hearing aid receiver according to a sixth embodiment of the invention.

FIG. 9 illustrates a vertical section of an earpiece 51 accommodating a receiver 52 according to a sixth embodiment of the invention. The receiver 52 is attached to the sound conduit 53 at the sound conduit inlet port 55 by a pibe stub of the receiver engaging an o-ring 56. The earpiece holding means 57 supports the o-ring. The holding means are U-shaped around the lower part of the o-ring and L-shaped around the upper part of the o-ring. The o-ring is preferably made of a resilient material, such as, for example, silicone rubber in order to allow the o-ring to be mounted in the holding means. The earpiece accommodating means 58 allows the receiver to be accommodated in the earpiece without the need for e.g. removing material in order to provide space for it.

In a further embodiment according to the invention the earpiece comprises holding and accommodating means for all the components necessary for an ITE hearing aid.

The integration of the holding and accommodating means in the earpiece body allows the earpiece manufacturing to be improved with respect to both speed and automatization.

In an embodiment according to the invention the method for manufacturing a hearing aid earpiece comprises the steps of making an impression of the ear, including the ear canal, of the hearing impaired person, performing a scanning of the ear impression in order to obtain data for a three dimensional computer model of a part of the ear including the ear canal, forming a three-dimensional computer model of the outer shape of the hearing aid earpiece based on the acquired data, forming a three-dimensional computer model of the shape of the sound conduit inside the hearing aid earpiece based on a predetermined sound conduit length and manufacturing the hearing aid earpiece in a rapid prototyping process based on said three-dimensional computer models.

This method has the advantage of automating an otherwise very complex manufacturing process.

In an embodiment the rapid prototyping process is Stereo Lithography (SLA), where a container of photosensitive resin contains a vertically-moving platform. The hearing aid component under preparation is supported by the platform that moves down by decrements that determine the layer thickness for each layer. A laser beam traces out the shape of the intended specimen in a respective layer to harden the photosensitive resin along the trace. The process repeats until the hearing aid component is complete. Hereby a hearing aid component is manufactured. A suitable material is a hard material, e.g. acrylic.

One advantage of this process is that the walls between the sound conduit parts may be quite thin. The sound conduit walls according to the present invention could be designed with a minimum thickness in the range of 100 to 600 um. As an example the minimum wall thickness could be 500 um.

Generally, the manufactured earpiece will have to accommodate at least one hearing aid component. Therefore, means for accommodating a hearing aid component within the earpiece and holding means adapted for providing an acoustical connection between a sound conveying hearing aid component and the sound conduit should be included in the manufacturing of the earpiece. These means should therefore also be part of the three-dimensional model of the earpiece.

However, the holding means adapted for providing an acoustical connection between a sound conveying hearing aid component and the sound conduit may also need one or more separate components for securing or optimizing the acoustical connection.

The means for accommodating a hearing aid component within the earpiece may comprise simple means adapted for providing space for the hearing aid component within the earpiece, means for more precise positioning of the hearing aid component within the earpiece using e.g. various alignment structures and means adapted for holding the hearing aid component fixed within the earpiece.

In an embodiment the hearing aid earpiece comprises a part in contact with the ear canal manufactured from a resilient material, thereby obtaining the advantage of such a material in terms of e.g. increased user comfort. This method is further described in PCT application PCT/EP2008/063663, published as WO 2010/040419, the contents of which are herewith incorporated by reference.

Other modifications and variations of the structures and procedures will be evident to those skilled in the art.

The invention claimed is:

1. A hearing aid earpiece comprising a body that is custom fitted to the individual shape of the ear canal of a user and which contains a receiver for reproducing sound responsive to a sound signal generated outside of said ear canal, said body being manufactured in a rapid prototyping process and including a sound conduit adapted for conveying an acoustic signal from an acoustic inlet port towards an acoustic outlet port, wherein the sound conduit is formed in a computer model to be looped such that at least one geometrical plane will intersect the sound conduit at least three times thereby providing a length of the sound conduit exceeding a largest outer dimension of the hearing aid earpiece.

2. The hearing aid earpiece according to claim 1, wherein the geometrical plane is perpendicular to the general axis of the open ear canal of the intended user.

3. The hearing aid earpiece according to claim 1, wherein the geometrical plane is perpendicular to a line connecting the acoustic inlet port and acoustic outlet port of the sound conduit.

4. The hearing aid earpiece according to claim 1, wherein the geometrical plane includes the general axis of the open ear canal of the intended user.

5. The hearing aid earpiece according to claim 1, wherein the geometrical plane intersects the sound conduit at least 5 times.

6. The hearing aid earpiece according to claim 1, wherein the geometrical plane intersects the sound conduit at least 7 times.

7. The hearing aid earpiece according to claim 1, wherein said body further comprises holding means adapted for providing an acoustical connection of a sound conveying hearing aid component to the acoustic inlet port.

8. The hearing aid earpiece according to claim 7, wherein said sound conveying hearing aid component is a sound tube.

9. The hearing aid earpiece according to claim 7, wherein said sound conveying hearing aid component is a hearing aid receiver.

10. The hearing aid earpiece according to claim 1, wherein said body comprises means adapted for accommodating a sound conveying component in the hearing aid earpiece.

11. The hearing aid earpiece according to claim 1, wherein said body comprises means adapted for accommodating a microphone, a battery and a microelectronic circuit comprising a signal processor.

12. The hearing aid earpiece according to claim 1, wherein the sound conduit is longer than 60 mm.

13. The hearing aid earpiece according to claim 1, wherein the sound conduit is longer than 80 mm.

14. The hearing aid earpiece according to claim 1, wherein the sound conduit is shaped such that the diameter of the sound conduit is gradually increasing from the acoustic inlet port to the acoustic outlet port.

15. The hearing aid earpiece according to claim 14, wherein the sound conduit diameter varies along the length of the conduit to at least span the interval from 1.7 to 2.0 mm.

16. The hearing aid earpiece according to claim 15, wherein the sound conduit is designed with an inlet port diameter in the range of 1.0 to 1.7 mm.

17. The hearing aid earpiece according to claim 15, wherein the sound conduit is designed with an outlet port diameter in the range of 2.0 to 4.0 mm.

18. A hearing aid comprising an earpiece comprising a body that is custom fitted to the individual shape of the ear canal of a user and which contains a receiver for reproducing sound responsive to a sound signal generated outside of said ear canal, said body being manufactured in a rapid prototyping process and including a sound conduit adapted for conveying an acoustic signal from an acoustic inlet port towards an acoustic outlet port, wherein the sound conduit is formed in a computer model to be looped such that at least one geometrical plane will intersect the sound conduit at least three times thereby providing a length of the sound conduit exceeding a largest outer dimension of the hearing aid earpiece.

19. A method for manufacturing a hearing aid earpiece comprising a body that is custom fitted to the individual shape of the ear canal of a user and which contains a receiver for reproducing sound responsive to a sound signal generated outside of said ear canal, and including a sound conduit adapted for conveying an acoustic signal from an acoustic inlet port towards an acoustic outlet port, wherein the sound conduit is looped such that at least one geometrical plane will intersect the sound conduit at least three times thereby providing a length of the sound conduit exceeding a largest outer dimension of the hearing aid earpiece, said method comprising the steps of,

- acquiring data representing the shape of a part of the ear including the ear canal of a hearing aid user,
- forming a three-dimensional computer model of the outer shape of the hearing aid component based on the acquired data,
- forming a three-dimensional computer model of the shape of the sound conduit inside the hearing aid earpiece based on a predetermined sound conduit length, and
- manufacturing the hearing aid earpiece in a rapid prototyping process based on said three-dimensional computer models.

20. The hearing aid earpiece according to claim 1, wherein said sound conduit comprises a plurality of sound conduit segments extending substantially along an axis of said ear canal so as to overlap along said axis, and interconnected by curved sound conduit segments.

21. The hearing aid earpiece according to claim 20, wherein a wall thickness between at least some of said sound conduit segments is less than 600 microns.

* * * * *